United States Patent [19]
Pannell

[11] Patent Number: 5,935,698
[45] Date of Patent: Aug. 10, 1999

[54] COMPOSITES JOINED WITH PRECURED, Z-PINNED STRIPS

[75] Inventor: Shawn D. Pannell, Newcastle, Wash.

[73] Assignee: The Boeing Company, Seattle, Wash.

[21] Appl. No.: 08/813,083

[22] Filed: Mar. 7, 1997

Related U.S. Application Data

[62] Division of application No. 08/660,060, May 31, 1996.
[51] Int. Cl.$^6$ .................................. B32B 3/06; B32B 7/08
[52] U.S. Cl. ........................... 428/223; 428/102; 428/119; 428/120
[58] Field of Search ..................................... 428/223, 119, 428/120, 102; 156/91, 92, 272.4, 275.5, 275.7, 306.9, 307.1

[56] References Cited

U.S. PATENT DOCUMENTS

| | | |
|---|---|---|
| 2,171,530 | 9/1939 | Balfe ........................................ 156/92 |
| 4,489,123 | 12/1984 | Schijve et al. . |
| 4,528,051 | 7/1985 | Heinze et al. ............................. 156/92 |
| 4,808,461 | 2/1989 | Boyce et al. ............................. 428/119 |
| 5,041,321 | 8/1991 | Bending . |
| 5,186,776 | 2/1993 | Boyce et al. .............................. 156/92 |
| 5,376,598 | 12/1994 | Preedy et al. . |
| 5,441,682 | 8/1995 | Baker et al. . |
| 5,445,861 | 8/1995 | Newton et al. . |
| 5,466,506 | 11/1995 | Freitas et al. ............................ 428/119 |
| 5,530,227 | 6/1996 | Matsen et al. .......................... 264/403 |
| 5,549,771 | 8/1996 | Brooker .............................. 156/303.1 |
| 5,589,015 | 12/1996 | Fusco et al. .............................. 156/92 |

FOREIGN PATENT DOCUMENTS

| | | |
|---|---|---|
| 58-104713 | 12/1981 | Japan . |
| 58-104714 | 12/1981 | Japan . |

*Primary Examiner*—Daniel Stemmer
*Attorney, Agent, or Firm*—John C. Hammar

[57] ABSTRACT

Prefabricated composite detail parts use precured strips that include Z-pin reinforcement along the bond line. Each strip has Z-pin stubble protruding from opposed faces so that the pins are embedded into the detail parts when the joint forms.

9 Claims, 10 Drawing Sheets

COMPOSITES JOINED WITH PRECURED, Z-PINNED STRIPS

REFERENCE TO RELATED APPLICATION

The present application is a divisional application based upon U.S. patent application Ser. No. 08/660,060, filed May 31, 1996.

TECHNICAL FIELD

The present invention relates to adding Z-pin reinforcement to the bond line using precured Z-pinned strips for cocured, bonded, or welded composite structures.

BACKGROUND ART

The use of composites in primary structure in aerospace applications is limited today because of their relatively high cost. A significant contribution to the total cost is the assembly cost where the precured composite elements are assembled, drilled, and fastened. The necessary design for mechanical fastening complicates the structure, especially in thin sections, because of the need for access to both sides of the bond line.

While composites might be adhesively bonded, cocured, or welded, these connecting processes generally produce bonds that rely upon the resin matrix for strength. The bond line lacks any reinforcing material to help with load transfer. These bonds generally have modest strength, and are susceptible to disbanding with shock impact or other "out of plane" forces affecting the assembly. Such forces often arise in environments prone to vibration.

1. Composite Manufacturing

Fiber-reinforced organic resin matrix composites have a high strength-to-weight ratio (specific strength) or a high stiffness-to-weight ratio (specific stiffness) and desirable fatigue characteristics that make them increasingly popular as a replacement for metal in aerospace applications where weight, strength, or fatigue is critical. Thermoplastic or thermoset organic resin composites would be more economical if the manufacturing processes reduced touch labor and forming time.

Prepregs combine continuous, woven, or chopped reinforcing fibers with an uncured matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension or fused into a single piece) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay from heating and cooling the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary) and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717 a flat composite prepreg panel was sandwiched between two metal sheets made from a superplastically formable alloy, and was formed against a die having a surface precisely contoured to the final shape of the part.

Attempts have been made to reduce composite fabrication times by actively cooling the tools after forming the composite part. These attempts have shortened the time necessary to produce a composite part, but overall fabrication costs remain high. Designing and making tools to permit their active cooling increases their cost.

Boeing described in U.S. Pat. No. 5,530,227 a process for organic matrix forming and consolidation using induction heating. Prepregs were laid up in a flat sheet between aluminum susceptor facesheets. The facesheets were susceptible to heating by induction and formed a retort to enclose the prepreg preform. To ensure an inert atmosphere around the composite during curing and to permit withdrawing volatiles and outgassing from around the composite during the consolidation, they welded the facesheets around their periphery. Such welding unduly increased the preparation time and the cost for part fabrication. It also ruined the facesheets (i.e., prohibited their reuse which added a significant cost penalty to each part fabricated with this approach). Boeing also described in U.S. Pat. No. 5,599,472 a technique that readily and reliably sealed the facesheets of the retort without the need for welding and permitted reuse of the facesheets in certain circumstances. This "bag-and-seal" technique applies to both resin composite and metal processing.

2. Processing in an Induction Press

The dies or tooling for induction processing are ceramic because a ceramic is not susceptible to induction heating and, preferably, is a thermal insulator (i.e., a relatively poor conductor of heat). Ceramic tooling is strengthened and reinforced internally with fiberglass rods or other appropriate reinforcements and externally with metal or other durable strongbacks to permit it to withstand the temperatures and pressures necessary to form, to consolidate, or otherwise to process the composite materials or metals. Ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in our prior work, is sealed within the susceptor retort.

Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in the induction heating workcell do not heat to as high a temperature as the metal tooling of conventional, prior art presses, problems caused by different coefficients of thermal expansion between the tools and the workpiece are reduced. Furthermore, Boeing's induction heating press is energy efficient because significantly higher percentages of input energy go to heating the workpiece than occurs with conventional presses. The reduced thermal mass and ability to focus the heating energy permits change of the operating temperature rapidly which improves the products produced. Finally, the shop environment is not heated as significantly from the radiation of the large thermal mass of a conventional press. The shop is a safer and more pleasant environment for the press operators.

In induction heating for consolidating or forming organic matrix composite materials as previously described, a thermoplastic organic matrix composite preform of PEEK or ULTEM, for example, is placed within the metal susceptor envelope (i.e., retort). These thermoplastics have a low concentration of residual volatile solvents and are easy to use. The susceptor facesheets of the retort are inductively heated to heat the preform. Consolidation and forming pressure consolidates and, if applicable, forms the preform at its curing temperature. The sealed susceptor sheets form a pressure zone in the retort in a manner analogous to conventional vacuum bag processes for resin consolidation. The retort is placed in an induction heating press on the forming surfaces of dies having the desired shape of the molded composite part. After the retort and preform are inductively heated to the desired elevated temperature, differential pressure (while maintaining the vacuum in the pressure zone around the preform) across the retort which functions as a diaphragm in the press forms the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time to help form the composite panel or workpiece. The shared wall of the three layer sandwich that defines the two pressure zones acts as a diaphragm.

Boeing can perform a wide range of manufacturing operations in its induction heating press. These operations have optimum operating temperatures ranging from about 350° F. (175° C.) to at least about 1850° F. (1010° C.). For each operation, the temperature is held relatively constant for several minutes to several hours. While controlling the input power fed to the induction coil controls the temperature, a better and simpler way capitalizes on the Curie temperature. Judicious selection of the metal or alloy in the retort's susceptor facesheets avoids excessive heating irrespective of the input power. With improved control and improved temperature uniformity in the workpiece, they produce better products. This method capitalizes on the Curie temperature phenomenon to control the absolute temperature of the workpiece and to obtain substantial thermal uniformity in the workpiece, by matching the Curie temperature of the susceptor to the desired temperature of the induction heating operation being performed. This temperature control method is explained in greater detail in U.S. Pat. No. 5,723,849.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

In contrast, thermoplastic welding, which eliminates fasteners, joins thermoplastic composite components at high speeds with minimum touch labor and little, if any, pretreatments. In our experience, the welding interlayer (compromising the susceptor and surrounding thermoplastic resin either coating the susceptor or sandwiching it) also can simultaneously take the place of shims required in mechanical fastening. As such, composite welding holds promise to be an affordable joining process. For "welding" a combination of thermoplastic and thermoset composite parts together, the resin that the susceptor melts functions as a hot melt adhesive. If fully realized, thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly was required in this process which limited its application.

Prior art disclosing thermoplastic welding with induction heating is illustrated by U.S. Pat. Nos. 3,966,402 and 4,120,712. In these patents, conventional metallic susceptors are used and have a regular pattern of openings of traditional manufacture. Achieving a uniform, controllable temperature in the bond line, which is crucial to preparing a thermoplastic weld of adequate integrity to permit use of welding in aerospace primary structure, is difficult with conventional susceptors.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes. The surfaces are held in contact while the thermoplastic cools below the softening temperature.

Simple as the thermoplastic welding process sounds, it is difficult to perform reliably and repeatably in a real factory on full-scale parts to build a large structure such as an airplane wing box. One difficulty is heating to the bond line properly without overheating the entire structure. It also is difficult to achieve intimate contact of the faying surfaces of the two parts at the bond line during heating and cooling because of the normal imperfections in the flatness of composite parts, thermal expansion of the thermoplastic during heating to the softening or melting temperature, flow of the thermoplastic out of the bond line under pressure (i.e., squeeze out), and contraction of the thermoplastic in the bond line during cooling.

The exponential decay of the strength of magnetic fields dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some cases, destruction or denaturing of the resin. To avoid overheating of the outer plies and to insure adequate heating of the inner plies, we use a susceptor of significantly higher conductivity than the fibers to peak the heating selectively at the bond line. An electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. It is necessary to have an open or mesh pattern in the susceptor embedded at the bond line to allow the resin to create the fusion bond between the composite elements of the assembly when the resin heats and melts.

a. Moving coil welding processes

In U.S. Pat. No. 5,500,511, Boeing described a tailored susceptor for approaching the desired temperature uniformity. This susceptor, designed for use with the cup coil of U.S. Pat. No. 5,313,037, relied upon carefully controlling the geometry of openings in the susceptor (both their orientation and their spacing) to distribute the heat evenly. Boeing inventors suggested using a regular array of anisotropic, diamond shaped openings with a ratio of the length (L) to the width (W) greater than 1 to provide a superior weld by producing a more uniform temperature than obtainable using a susceptor having a similar array, but one where the L/W ratio was one. By changing the length to width ratio (the aspect ratio) of the diamond-shaped openings in the susceptor, they achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, they altered the current density in regions near the edges by increasing the foil density (i.e., the absolute amount of metal). Increasing the foil density along the edge of the susceptor increases the conductivity along the edge and reduces the current density and the edge heating. They increased foil density by folding the susceptor to form edge strips of double thickness or by compressing openings near the edge of an otherwise uniform susceptor. These susceptors were difficult to reproduce reliably. Also, their use forced careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

The selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444, 220, which I incorporate by reference), because that coil provides a controllable area of intense, uniform heating under its poles; a trailing region with essentially no heating; and a leading region with minor preheating.

Boeing achieved better performance (i.e., more uniform heating) in rib welding by using the selvaged susceptor having edge strips without openings. The susceptor had a center portion with a regular pattern of opening and solid foil edges, which they referred to as selvage edge strips. Embedded in a thermoplastic resin to make a susceptor/resin tape, the susceptor is easy to handle and to use in preforming the composite pieces prior to welding. With a selvaged susceptor, the impedance of the central portion should be anisotropic with a lower transverse impedance than the longitudinal impedance. Here, L should be less than W. With the selvaged susceptor in the region immediately under the asymmetric induction work coil, current flows across the susceptor to the edges where the current density is lowest and the conductivity, highest.

Generally, the selvaged susceptor is somewhat wider than normal so that the selvage edge strips are not in the bond line. Boeing sometimes removes the selvage edge strips after forming the weld, leaving only a perforated susceptor foil in the weld. This foil has a relatively high open area fraction.

Significant effort has been expended in developing inductor and susceptor systems to optimize the heating of the bond line in thermoplastic assemblies. One difficulty in perfecting the process to the point of practical utility for producing large scale aerospace structures in a production environment is control of the surface contact of the faying surfaces of the two parts to be welded together. The problem involves the timing, intensity, and schedule of heat application so the material at the faying surfaces is brought to and maintained within the proper temperature range for the requisite amount of time for an adequate bond to form. Intimate contact in maintained while the melted or softened material hardens in its bonded condition.

Large scale parts such as wing spars and ribs, and the wing skins that are bonded to the spars and ribs, are typically on the order of 20–30 feet long at present, and potentially as much as 100 feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as asperities and depressions. These irregularities interfere with full surface area contact between the faying surfaces of the two parts and actually result in surface contact only at a few "high points" across the intended bond line. Applying pressure to the parts to force the faying surfaces into contact achieves additional surface contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "I" beam flanges to the softening point, so they begin to yield or sag under the application of the pressure needed to achieve a good bond.

The multipass thermoplastic welding process described in U.S. Pat. No. 5,486,684 (which I also incorporate by reference) enables a moving coil welding process to produce continuous or nearly continuous fusion bonds over the full area the bond line. The result is high strength welds produced reliably, repeatably, and with consistent quality. This multipass welding process produces improved low cost, high strength composite assemblies of large scale parts fusion bonded together with consistent quality. It uses a schedule of heat application that maintains the overall temperature of the structure within the limit in which it retains its high strength. Therefore, it does not require internal tooling to support the structure against sagging which otherwise could occur when the bond line is heated above the high strength temperature limit. The process also produces nearly complete bond line area fusion on standard production composite material parts having the usual surface imperfections and deviations from perfect flatness. The multipass welding process eliminates fasteners and the expense of drilling holes, inspecting the holes and the fasteners, inspecting the fasteners after installation, sealing between the parts and around the fastener and the holes; reduces mismatch of materials; and eliminates arcing from the fasteners.

In the multipass process, an induction heating work coil is passed multiple times over a bond line while applying pressure in the region of the coil to the components to be welded, and maintaining the pressure until the resin hardens. The resin at the bond line is heated to the softening or melting temperature with each pass of the induction work coil and pressure is exerted to flow the softened/melted resin in the bond line and to reduce the thickness of the bond line. The pressure improves the intimacy of the faying surface contact with each pass to improve continuity of bond. The total time at the softened or melted condition of the thermoplastic in the faying surfaces is sufficient to attain deep interdiffusion of the polymer chains in the materials of the two faying surfaces throughout the entire length and area of the bond line. The process produces a bond line of improved strength and integrity in the completed part. The total time of the faying surfaces at the melting temperature is divided into separate time segments which allows time for the heat in the interface to dissipate without raising the temperature of the entire structure to the degree at which it loses its strength and begins to sag. The desired shape and size of the final assembly is maintained.

A structural susceptor includes fiber reinforcement within the weld resin to alleviate residual tensile strain otherwise present in an unreinforced weld. The susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, Boeing prefers to use at least two plies of fiber reinforcement on each side of the susceptor. This structural susceptor is described in greater detail in U.S. Pat. No. 5,717,191, which I incorporate by reference.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which are too wide to create a quality weld using the conventional susceptors.

It is easy to tailor the thickness of the structural susceptor to match the measured gap by scoring through the appropriate number of plies of resin and fiber reinforcement and peeling them off. In doing so, a resin rich layer will be on both faying surfaces and this layer should insure better performance from the weld.

b. Fixed coil induction welding

In the induction heating workcell, the process differs from the moving coil processes because of the coil design and resulting magnetic field. The fixed coil workcell presents promise for welding at faster cycle times than the moving coil processes because it can heat multiple susceptors simultaneously. The fixed coil can reduce operations to minutes where the moving coil takes hours. The keys to the process, however, are achieving controllable temperatures at the bond line in a reliable and reproducible process that assure quality welds of high bond strength. The fixed coil induces currents to flow in the susceptor differently from the moving coils and covers a larger area. Nevertheless, proper processing parameters permit welding with Boeing's induction heating workcell using a susceptor at the bond line.

Another advantage with the fixed coil process is that welding can occur using the same tooling and processing equipment used to consolidate the skin, thereby greatly reducing tooling costs. The fixed coil heats the entire bond line at one time to eliminate the need for shims that are currently used with the moving coil. We can control the temperature and protect against overheating by using "smart" susceptors as a retort or as the bond line susceptor material or both.

The need for a susceptor in the bond line poses many obstacles to the preparation of quality parts. The metal which is used because of its high susceptibility differs markedly in physical properties from the resin or fiber reinforcement so dealing with it becomes a significant issue. The reinforced susceptor of U.S. Pat. No. 5,808,281 (which I also incorporate by reference) overcomes problems with conventional susceptors by including the delicate metal foils (0.10–0.20 inch wide×0.005–0.010 inch thick; preferably 0.10×0.007 inch) in tandem with the warp fibers of the woven reinforcement fabric. The foil is always on the remote side of the fabric because it is between the warp thread and the weave threads. This arrangement holds the foils in place longitudinally in the fabric in electrical isolation from each other yet substantially covering the entire width of the weld surface while still having adequate space for the flow and fusion of the thermoplastic resin. Furthermore, in the bond line, the resin can contact, wet, and bond with the reinforcing fiber rather than being presented with the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will focus.

I improve the strength and durability of adhesive bonds or thermoplastic welds connecting composite structure by adding Z-pin mechanical reinforcement to the bond line with precured bonding strips.

4. Z-Pin Reinforcement

First, some general discussion about the benefits of Z-pins in composite assemblies.

Composite sandwich structures having resin matrix skins or facesheets adhered to a honeycomb or foam core are used in aerospace, automotive, and marine applications for primary and secondary structure. The facesheets typically are reinforced organic matrix resin composites made from fiberglass, carbon, ceramic, or graphite fibers reinforcing a thermosetting or thermoplastic matrix resin. The facesheets carry the applied loads, and the core transfers the load from one facesheet to the other or absorbs a portion of the applied load. In either case, it is important that all layers of the structure remain rigidly connected to one another. Noise suppression sandwich structure or sandwich structures for other applications are described in U.S. Pat. No. 5,445,861, which I also incorporate by reference.

Keeping the facesheets adhered to the foam is problematic. The most common source of delamination stems from a relatively weak adhesive bond that forms between the facesheets and the foam core. That is, pulloff strength of the facesheets in shear is low. Efforts to strengthen the bond have generally focused on improving the adhesive, but those efforts have had limited success.

Delamination can arise from differences in the coefficient of thermal expansion (CTE) of the different material layers. As a result, as temperatures oscillate, the facesheet or foam may expand or contract more quickly than its adjoining layer. In addition to causing layer separation, CTE differences can significantly distort the shape of a structure, making it difficult to maintain overall dimensional stability. Conventional sandwich structure optimizes the thickness of a structure to meet the weight and space limitations of its proposed application. Sandwich structures are desirable because they are usually lighter than solid metal or composite counterparts, but they may be undesirable if they must be larger or thicker to achieve the same structural performance. Providing pass-throughs (i.e., holes), which is relatively easy in a solid metal structure by simply cutting holes in the desired locations, is more difficult in a composite sandwich structure because holes may significantly reduce the load carrying capability of the overall structure.

Foster-Miller has been active in basic Z-pin research. U.S. Pat. No. 5,186,776 describes a technique for placing Z-pins in composite laminates involves heating and softening the laminates with ultrasonic energy with a pin insertion tool which penetrates the laminate, moving fibers in the laminate aside. The pins are inserted either when the insertion tool is withdrawn or through a barrel in the tool prior to its being withdrawn. Cooling yields a pin-reinforced composite. U.S. Pat. No. 4,808,461 describes a structure for localized reinforcement of composite structure including a body of thermally decomposable material that has substantially opposed surfaces, a plurality of Z-pin reinforcing elements captured in the body and arranged generally perpendicular to one body surface. A pressure plate (i.e., a caul plate) on the other opposed body surface drives the Z-pins into the composite structure at the same time the body is heated under pressure and decomposes. I incorporate U.S. Pat. No. 4,808,461 and 5,186,776 by reference.

A need exists for a method to form a sandwich structure that (1) resists distortion and separation between layers, in particular, separation of the facesheets from the core; (2) maintains high structural integrity; (3) resists crack propagation; (4) easily accommodates the removal of portions of core, as required by specific applications, and (5) allows the structure to be easily manufactured and formed into a variety of shapes. In U.S. patent application Ser. No. 08/582,297 (which I incorporate by reference), Childress described such a method of forming a pin-reinforced foam core sandwich structure. Facesheets of uncured fiber-reinforced resin (i.e., prepreg or B-stage thermoset) are placed on opposite sides of a foam core. The core has at least one compressible sublayer and contains a plurality of Z-pins spanning the foam between the facesheets. Childress inserts the Z-pins into the facesheets during autoclave curing of the facesheet resin when a compressible sublayer is crushed and the back pressure applied trough the caul plate or other suitable means drives the Z-pins into one or both of the facesheets to form a pin-reinforced foam core sandwich structure. By removing some of the foam core by dissolving, eroding, melting, drilling, or the like to leave a gap between the facesheets, he produces his corresponding column core structure.

The foam core generally is itself a sandwich that includes a high density foam sublayer, and at least one low density, compressible or crushable foam sublayer. The preferred arrangement includes a first and second low density foam sublayer sandwiching the high density sublayer. The Z-pins are placed throughout the foam core in a regular array normal to the surface or slightly off-normal at an areal density of about 0.375 to 1.50% or higher, as appropriate, extending from the outer surface of the first low density foam sublayer through to the outer surface of the second low density foam sublayer. Expressed another way with respect to the arrangement of the pins, there typically are 200 pin/in$^2$ or more. Preferably, the foam sublayers are polyimide or polystyrene, the Z-pins are stainless steel or graphite, and the facesheets are fiber-reinforced, partially cured or precured thermosetting or thermoplastic resin composites.

In U.S. Pat. No. 5,589,016, Hoopingarner et al. describe a honeycomb core composite sandwich panel having a surrounding border element (i.e., a "closeout") made of rigid foam board. The two planar faces of the rigid foam board are embossed or scored with a pattern of indentations usually in the form of interlinked equilateral triangles. The scoring is sufficiently deep and numerous to provide escape paths for volatiles generated inside the panel during curing and bonding of the resin in the facesheets to the honeycomb core and peripheral foam. The scoring prevents the development of excessive pressure between the facesheets in the honeycomb core that otherwise would interfere with the bonding. I incorporate this application by reference.

Rorabaugh and Falcone discovered two ways to increase the pulloff strength in foam core sandwich structure. First, they formed resin fillets around the fiber/resin interfaces at the contact faces of the foam core by dimpling the foam to create a fillet pocket prior to resin flow during curing. Second, they arranged the pins in an ordered fashion such as a tetrahedral configuration or a hat section configuration. In tetrahedral or hat section configurations, the pins not only provide a tie between the two skins but they also provide miniature structural support suited better for load transfer than normal or random off-normal (interlaced) or less ordered pin configurations. With ordering of the pins, they produce anisotropic properties. More details concerning their Z-pin improvements are available in their U.S. patent application Ser. No. 08/628,879 entitled "Highly Ordered Z-Pin Structures," which I incorporate by reference.

Adding Z-pins to thermoplastic welds or to adhesive bonds in induction heating bonding processes with precured bonding strips improves the bond or weld pulloff strength.

In U.S. patent application Ser. No. 08/658,927, entitled "Z-Pin Reinforced Bonds for Connecting Composite Structures," Childress introduced Z-pin mechanical reinforcement to the bond line of two or more composite elements by prefabricating cured composite elements that included protruding Z-pins (or stubble) along the element face that will contacted the bond line. The stubble was formed by including peel plys on this face during pin insertion using, for example, the process described in U.S. patent application Ser. No. 08/582,297, entitled "Pin-Reinforced Sandwich Structure." When connecting the element to other composite structure, Childress removed the peel plys to expose the stubble. Then, he assembled the several elements in the completed assembly to define the bond line.

One problem with Childress method is that it requires inserting the Z-pins into the detail parts, which forces modification of their manufacturing processes and tools. The present invention is a method to achieve Z-pin reinforcement using ordinary detail parts, which makes it more versatile, especially during the transition from unreinforced bond lines to Z-pinned assemblies.

SUMMARY OF THE INVENTION

Precured Z-pin strips readily permit the reinforced joining of prefabricated composite detail parts in adhesive bonding, cocuring, or thermoplastic welding processes. The strips have pin stubble projecting on opposed faces. The strips eliminate the need to incorporate the stubble into the detail parts, which would be difficult with traditional manufacturing operations like resin transfer molding (RTM) or fiber placement. The strips of the present invention are compatible with all major joining processes, are easy to manufacture, are easy to store, and have lasting shelf-life.

The strips are easy to prepare using a press that includes a silicone lay-up surface instead of the hard surfaces normally used in pin insertion operations in the prior art. The silicone allows controlled penetration of the pins. Once the strips are formed, because the resin is cured, the strips are easy to store without refrigeration or other protection until used in combination with conventional detail parts to fabricate joined composite assemblies.

The strips simplify the placement of the bond line and allow its location to be determined in a determinant assembly operation at the time the detail parts are arranged in the assembly jig. As such, the strips eliminate the need for precision placement of pins in the already expensive, precision detail parts. The ability to define the bond line at the time of assembly using precured parts also greatly simplifies the assembly process over competing processes that require the use of uncured parts.

The stubble is typically about $\frac{1}{16}$ inch high. So, if the element which the stubble contacts is a precured element, I use uncured resin pad ups or adhesive to fill the gaps. If the contacting element is uncured or partially cured, I generally do not use the pad up. The padups might be thermoplastic welding susceptors or my precured strip might include the susceptor.

Following assembly, I complete the bonding, cocuring, or welding using conventional joining techniques. Assemblies having Z-pin mechanical reinforcement are better able to withstand impact shock without peel failure.

DETAILED DESCRIPTION OF A PREFERRED EMBODIMENT

First, some general discussion about Z-pinning.

Z-pin bonding produces stronger bonds between composite detail parts than are achievable with adhesive bonds or fusion (i.e., welded) bonds. Z-pin bonding adds Z-direction reinforcement to the otherwise unreinforced joint in the organic matrix resin. The Z-pins mechanically reinforce the bond, especially in environments prone to vibration. I can use Z-pins at the joints between detail parts in adhesive bonding, cocuring, or welding processes to join two or more precured parts or a combination of precured and uncured detail parts.

In my Z-pin bonding process, I prepare a precured Z-pin strip having "stubble" protruding on both sides and position this strip along the intended bond line. Precured strips simplify the joining process because they can be used to join conventional detail parts rather than forcing changes in the manufacturing processes for the detail parts. They are versatile, can be pieced together, and can be trimmed to fit.

Throughout this discussion, I use "composite" to mean a fiber reinforced organic resin matrix material. The fibers should be of suitable strength to make aerospace structural parts, such as graphite, fiberglass, or carbon fibers. The organic resin can be a thermosetting resin, such as epoxy or bismaleimide, or a thermoplastic, such as ULTEM or KIIIB polyimide. Z-pinning is compatible with all fiber and resin systems.

The function and properties of the Z-pins are described in copending application Ser. No. 08/582,297 and U.S. Pat. No. 5,736,222 which I incorporate by reference. In Z-pin bonding, the resins should be compatible with the intended joint. The Z-pins might be the same material as the reinforcing fibers in the composite detail parts or can be different, as the situation dictates.

Next, I'll discuss an alternate joining process that Jamie Childress of Boeing developed.

Figure 1:
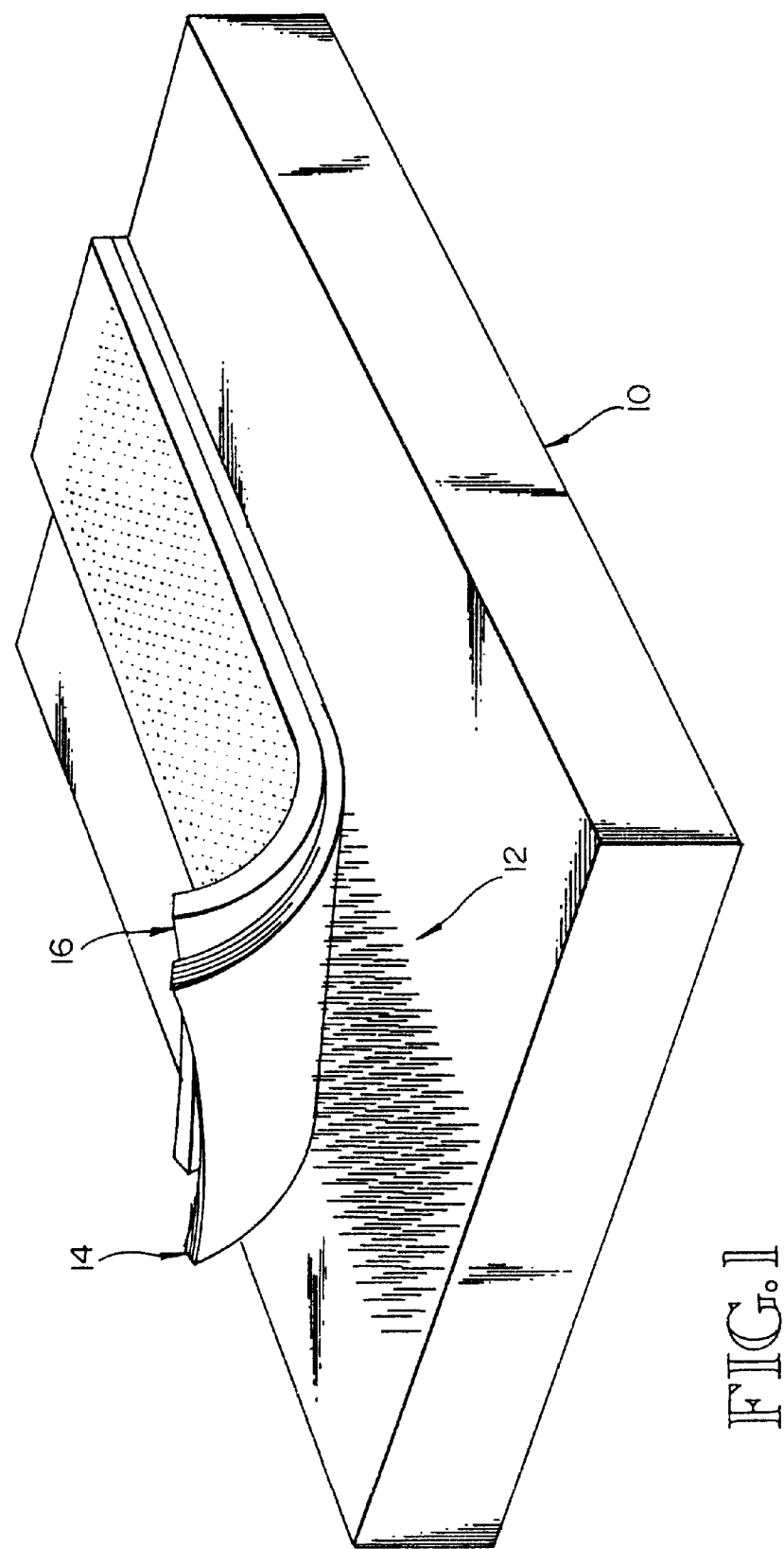
FIG. 1 is a schematic isometric showing the method for forming a composite with Z-pin reinforcement stubble along a bond line.

Childress's Z-pin bonding process (FIG. 1) uses a composite detail part 10 having a region 12 of Z-pin stubble along the intended bond line for connecting part 10 with other detail parts. Each Z-pin protrudes about 1/16 inch above the surface of part 10 (like the Indian "bed of nails") for ultimate insertion into the facing parts at the joint, although the length of the stubble varies with the application. To protect the stubble during manufacture and inventory of the part 10 prior to laying up the assembly for bonding, Childress covers the stubble with Teflon peel plys 14 and the residue of the pin-carrier foam 16 which holds the pins prior to their insertion into the detail part 10. In some applications, especially with a decomposable foam, it may be unnecessary to use a peel ply 14. The peel ply 14 functions to protect the Z-pin stubble during storage while leaving a clean surface in the stubble region when peeled away during the lay up process, and can be any suitable material.

The pins in the stubble 12 may be normal to the surface of part 10 or interlaced or highly ordered, as described in the Z-pin patent applications I incorporated earlier. That is, the pins can assume any desired arrangement. The density of pins is also variable to suit the application. Differences in the orientation of pins, their length, their strength, their density, etc. can change in different regions of the bond line. That is, the areal density of pins might be 1.0% on the left side of the part in FIG. 1 while being 1.5% on the right side. Alternately, the pin density might be higher around fasteners or might be higher near the edges of the bond line as opposed to along the centerline. Also, of course, the orientation may change at different regions along the bond line and orientations might even be mixed together, if desired.

By "orientation," I mean normal, interlaced, highly ordered, or the like as defined in Boeing's copending Z-pinning applications. For clarity in the drawings in the present application, I will simply illustrate the "normal" orientation.

The pin-carrying foam 16 is described in greater detail in the patent applications and prior art patents that I earlier incorporated by reference.

The composite detail part 10 can be a laminate of plys of fiber reinforced organic resin matrix material, or might be a sandwich panel with a foam, honeycomb or other core, or might even be column core. Basically, part 10 can be any material that has a resin interface for bonding to another detail part. I reinforce the joint between the resin and the other part at their interface.

Figure 2:
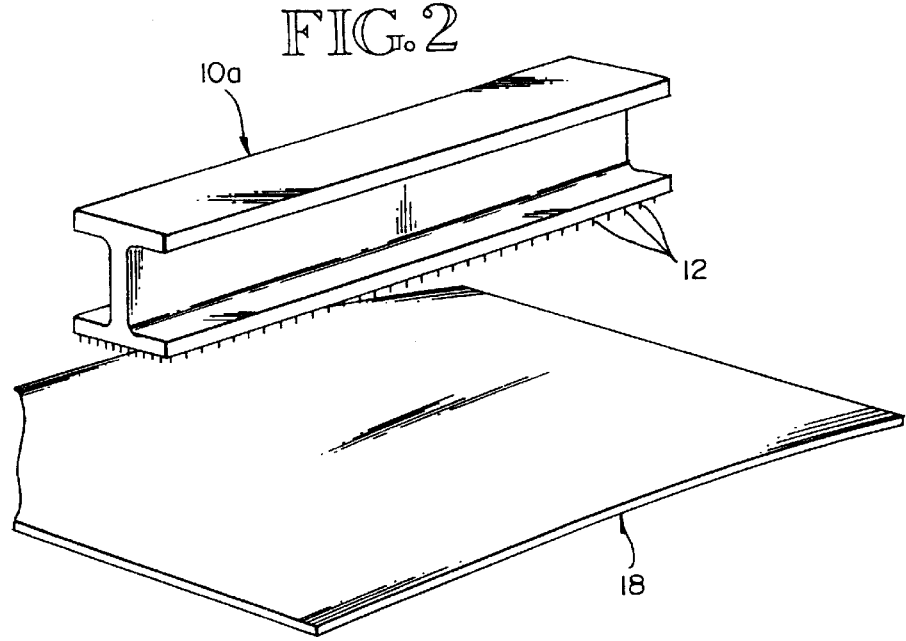
FIG. 2 is a schematic isometric showing layup of a stubbled I-beam spar in contact with an uncured skin panel.

As shown in FIG. 2, the detail part 10a might be fabricated as an I-beam spar rather than as a panel. In fact, the detail part can assume any shape so long as the shape is susceptible of Z-pin insertion to create the reinforcing stubble along the bond line.

Figure 3:
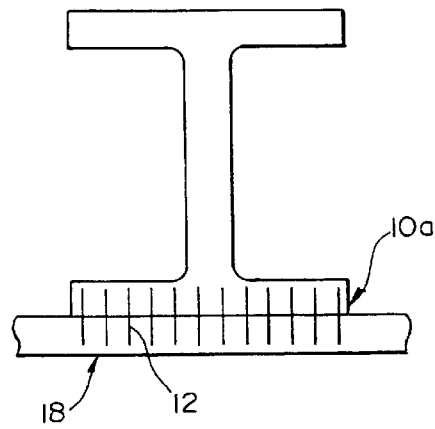
FIG. 3 is a schematic sectional view of the spar/panel assembly of FIG. 2 illustrating the reinforced bond line.

FIG. 2 illustrates placing the spar detail part 10a on an uncured panel 18 with the stubble 12 at the interface. FIG. 3 illustrates a typical cross-section of the spar-panel assembly. While the stubble 12 is shown on the spar in FIG. 2, the Z-pins could be on the spar, the panel, or both detail parts.

Figure 5:
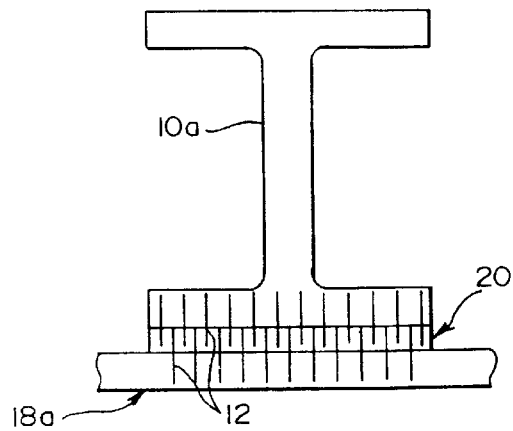
FIG. 5 is a schematic sectional view illustrating the bond line of an assembly made in accordance with FIG. 4.
Figure 4:
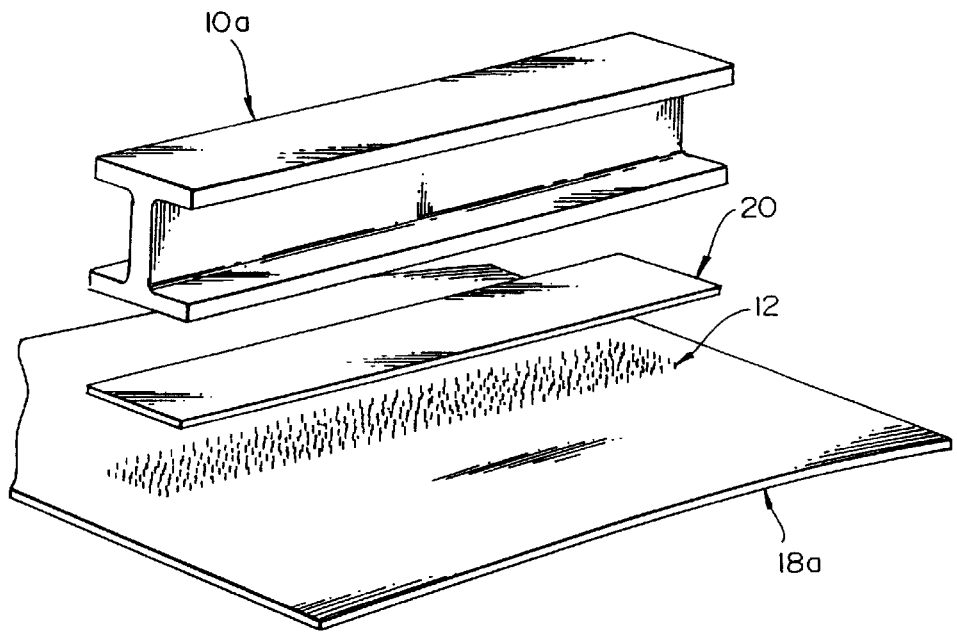
FIG. 4 is another schematic isometric illustrating layup of a stubbled spar to a cured skin with an intermediate pad up layer along the bond line.

As shown in FIG. 3, when the assembly of the spar 10a and panel 18 are bonded, the Z-pins in the stubble 12 penetrate into the uncured panel 18. In the circumstance where the panel 18a is precured, as shown in FIG. 4 and 5, Childress introduces a bond padup strip 20, typically of the same material as the detail parts being joined. The padup strip 20 is uncured during assembly and functions to bond the precured, thermoset detail parts when the bonding process is complete. The padup strip can be an uncured thermosetting resin prepreg with bonding becoming a cocuring process or might be any suitable adhesive bonding material. The padup strip might be a resin encased susceptor of the type shown in FIGS. 13 & 14 and as Boeing uses in its thermoplastic welding operations. In this case, the detail parts would be precured.

As best shown in FIG. 5, the spar detail part 10a includes a stubble surface so that the padup strip 20 ends up having pins extending upwardly from the panel 18a as well as downwardly from the spar 10a. In the present invention, in contrast to Childress, I put the Z-pins in the padup strip with stubble on the opposed faces.

Figure 6:
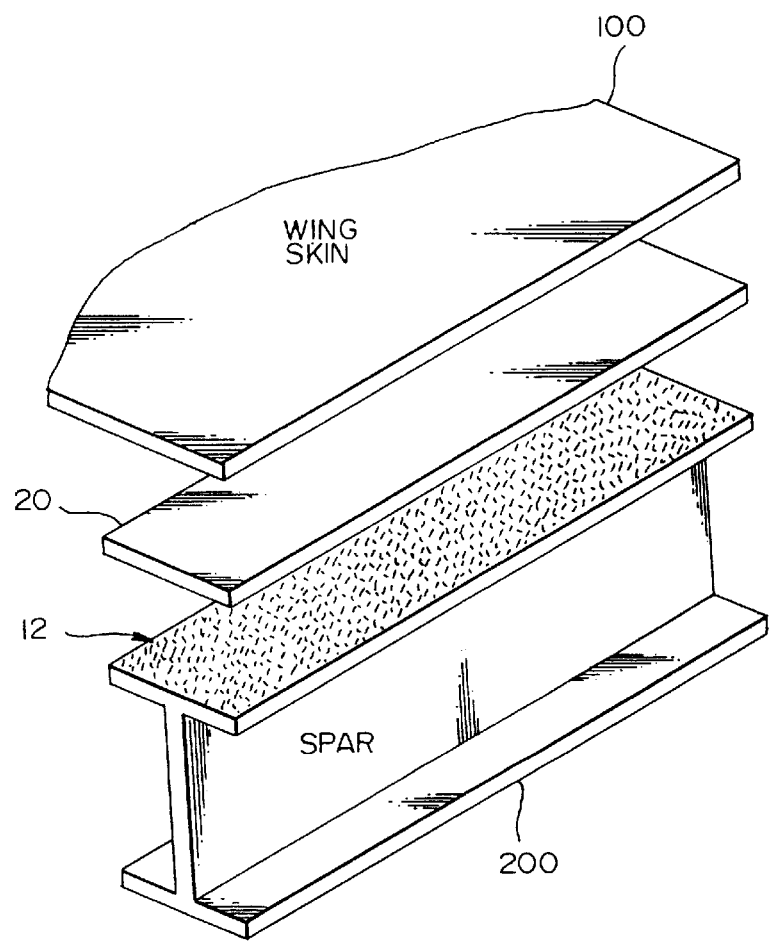
FIG. 6 is another schematic isometric illustrating layup of another stubbled spar to a cured skin.
Figure 7:
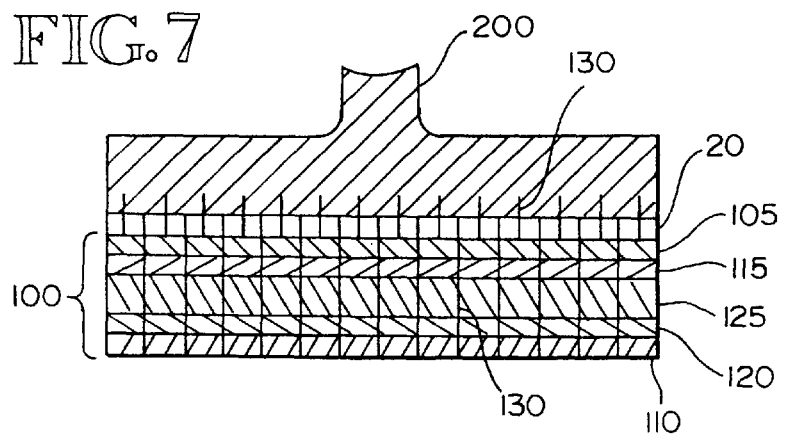
FIG. 7 is a schematic sectional view illustrating the bond line of an assembly made in accordance with FIG. 6, showing the sandwich structure on the skin permitting deeper penetration of the Z-pin reinforcement into the spar.
Figure 15:
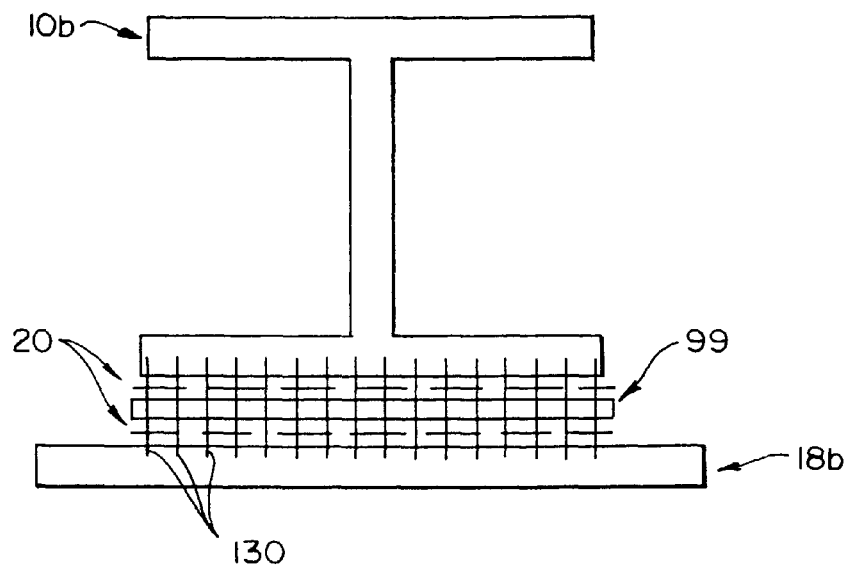
FIG. 15 is a schematic sectional view showing a precured strip connecting a skin and spar.

FIG. 6 and 7 illustrate Childress's process for bonding of a wing skin to a spar. FIG. 6 shows an exploded view of the wing skin 100, padup strip 20, and spar 200 while FIG. 7 shows a typical cross-section taken along the bond line. While FIG. 6 & 7 illustrate a wing skin-spar joint, the process is applicable to any structural aircraft joint. This embodiment shown uses a sandwich core structure for the wing skin to produce the stubble region and subsequent bonding of the skin to the precured spar with an uncured padup strip in a cocure, adhesive bonding, or welding operation. As I will describe later in this description, the wingskin and spar could also be joined with my precured strip carrying the Z-pins as shown in FIG. 15.

As best shown in FIG. 7, the skin 100 comprises a sandwich core structure of the type described in U.S. patent application Ser. No. 08/582,297 having outer facesheets 105 & 110, crushable foam layers 115 and 120, and a central foam core 125 with Z-pins 130 extending through all five layers. Stubble on the interface surface is achieved by crushing layers 115 and 120 more than the combined thickness of facesheets 105 and 110 during the autoclave cycle when the pins are inserted into the facesheets. Of course, after curing, the central foam 115, 120 and 125 might be dissolved to make a column core skin structure.

The facesheets 105 & 110 are positioned adjacent the foam core 115, 120 and 125, and are joined with a layer of adhesive. The pin-reinforced foam core using known methods (e.g., stitching or needling) or is purchased from companies such as Foster-Miller, Inc., in Waltham, Mass. I can score the foam core according to the Hoopingarner method to provide channels for venting of volatiles during curing.

The core generally is a closed cell foam that includes three sublayers: a high density central sublayer 125 and first and second low density, crushable foam sublayers 115 and 120 located on each side of the high density foam sublayer. While three layers are shown, it is to be understood that the foam core may be composed of any number of sublayers depending on the particular application. For example, the foam core may be a single low density sublayer; or, it may be a stack of alternating low density and high density sublayers. The foam core should be crushable during autoclave curing to permit the pins to extend into the facesheets. Low density polyimide (e.g., Rohacel™) or low density polystyrene (e.g., Styrofoam™) foams are the presently preferred low density sublayer materials, since they are easy to form and do not require extremely high temperatures or pressures to crush during autoclave curing. The low density sublayer may decompose at the autoclave temperatures.

If a high density sublayer 125 is included, it usually should be made of a material that will not crush during autoclave curing. Obviously, the precise temperatures and pressures to be used during autoclave curing will affect the selection of the material used to form the high density sublayer. Further considerations to be taken into account when selecting an appropriate high density sublayer material include whether the high density sublayer is to be removed after autoclave processing and the preferred method for removing it. Typically it is high density polystyrene or polyimide foam. It might be (i) syntactic foam having internal reinforcing spheres, (ii) a fiber-reinforced resin prepreg or composite, (iii) a fiberform or microform ceramic such as described in U.S. Pat. Nos. 5,376,598; 5,441,682; and 5,041,321 or in copending U.S. patent applications Ser. Nos. 08/209,847 or 08/460,788, (iv) a metal foil, (v) a metal foil resin laminate of the type described in U.S. Pat. No. 4,489,123 or U.S. patent application Ser. No. 08/585,304 entitled "Titanium-Polymer Hybrid Laminates," or (vi) a foam filled honeycomb core. The central sublayer 125 might also be a honeycomb core with the cells arranged normal to the plane of the facesheets. As Hoopingarner suggests, the core might combine these alternatives, like a central honeycomb core bordered by a foam closeout frame. If the high density sublayer is a prepreg or a composite, the product itself is a laminated composite. In such case, generally the resin in the facesheets would be the same as the resin in the high density sublayer.

The Z-pins 130 (here and in all the embodiments) may be any suitably rigid material, e.g., stainless steel, titanium, copper, graphite, epoxy, composite, glass, carbon, etc. The Young's modules of elasticity for the Z-pins is generally greater than $10^7$. Additionally, the Z-pins may be barbed, where appropriate, to increase their holding strength.

In the case of thermosets, the faying surfaces preferably are partially cured (B-stage) fiber-reinforced composite material.

Suitable reinforcing fibers include glass, graphite, arimide, ceramic, and the like. Suitable resins include epoxy, bismaleimide, polyimide, phenolic, or the like. (Virtually any thermoplastic or thermoset resin will suffice.)

Various procedures are available for laying up the composite facesheets. Since such procedures are generally known to those skilled in the art they are not described here.

Although thick, metal sheets do not work well as facesheets, I can use metal foil or metal foil/resin laminated composites. The metal foil in such cases might be welded to metallic Z-pins in the fashion described in U.S. patent application Ser. No. 08/619,957 entitled "Composite I Metal Structural Joint with Welded Z-Pins."

Figure 8:
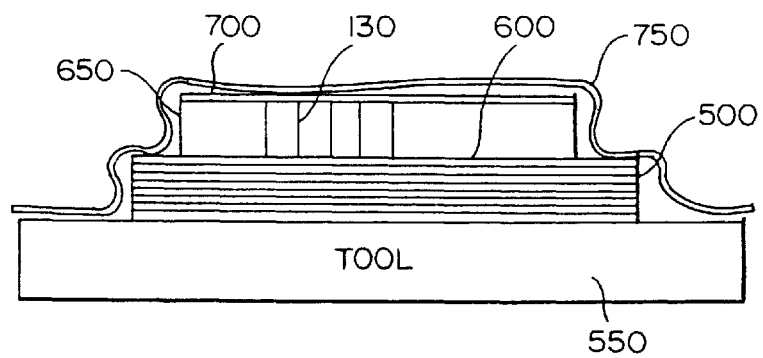
FIGS. 8–10 illustrate the process for making a stubbled composite.
Figure 9:
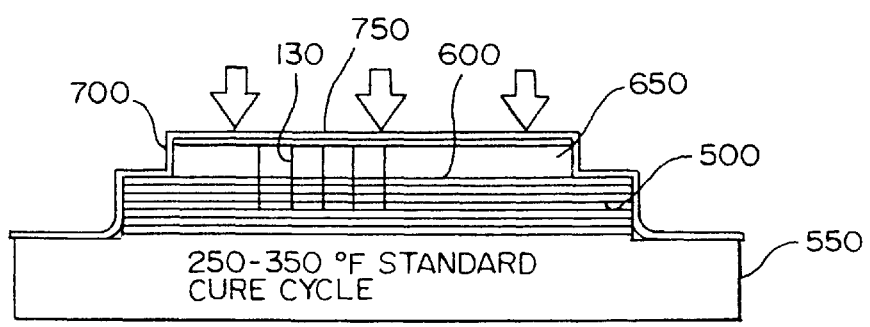
Figure 10:
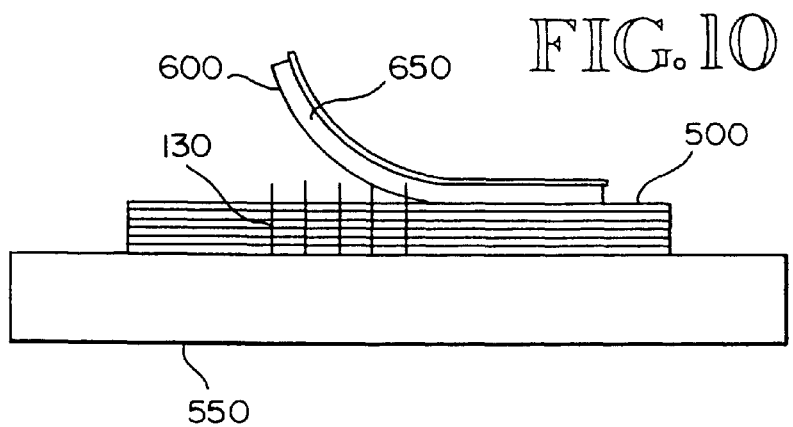

FIG. 8–10 illustrate Childress's preferred process for inserting the Z-pins into a detail part to leave a stubble interface. The detail part 500 (here a laminated panel having several layers of prepreg) is mounted on a work surface or layup mandrel 550 with appropriate release films between the part and tool. Another release film 600 caps the detail part 500 and separates the part 500 from a Z-pin preform 650 (i.e., a foam loaded with Z-pins 130 in a predetermined orientation). A rigid caul plate or backing tool 700 completes the assembly. All the layers are then wrapped in a conventional vacuum bag film 750 which is sealed to permit drawing a suction within the closed volume surrounding the assembly.

As shown in FIG. 9, in an autoclave under elevated temperature and pressure, the foam in the Z-pin preform 650 crushes and the Z-pins 130 are driven into the uncured detail part 500. After completing the cure cycle, the detail part 500 is cured and has the Z-pins 130 anchored within it. The crushed foam 650 and release ply 600 protect the stubble until assembly of the detail parts is desired. Thus, the process of FIG. 8–10 yields a cured detail part having a stubble field. Other processes can achieve the same result, including ultrasonic insertion into precured thermoplastic laminates.

Figure 11:
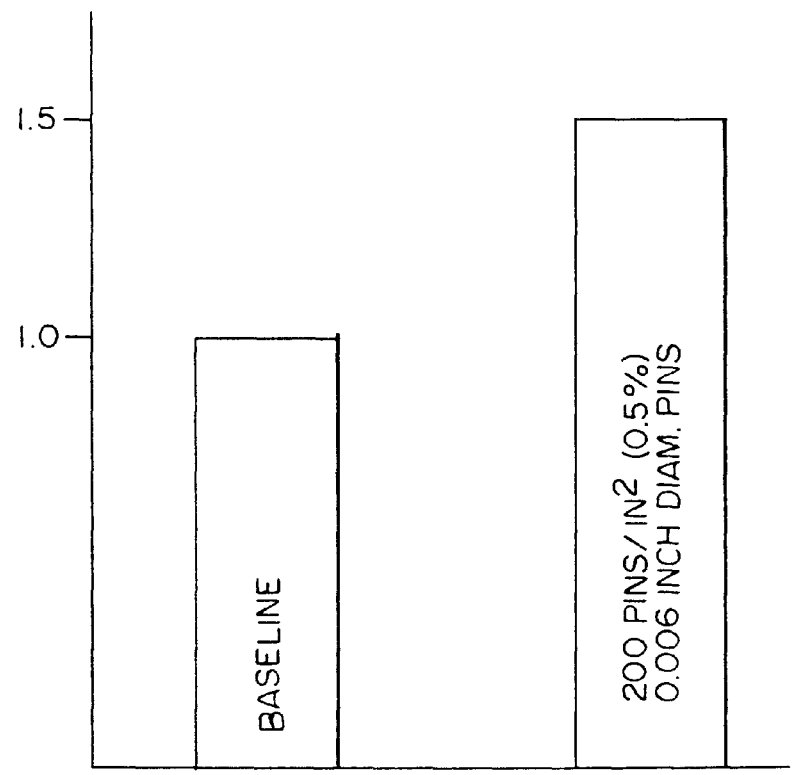
FIG. 11 is a chart showing the improvement in compression after impact strength for Z-pin reinforced structure.

As shown in FIG. 11, including Z-pin reinforcement in the joint improves compression after impact strength of the assembly. Childress's tests show about a 50% increase when using an areal density of 0.5% of 0.006 inch diameter pins in AS4-3501-6 test specimens following a 20 ft-lb impact. The joint nominally has the same compression and tensile strength prior to impact, but the inclusion of pins increase the compression ultimate strength when the assembly is subjected to low speed impact energy. In fact, the strain remains essentially constant over the range of impacts below which visible damage is not observed.

The following examples further illustrate Boeing's Z-pin experiments.

EXAMPLE 1

Childress made 3/16 inch quasi-isotropic composite test specimens from AS4/3501-6 having 0.5% areal density, 16 mil diameter T300/3501-6 Z-pins with sufficient surface peel plys to yield 0.080 inch stubble. As a control, one-half of the specimens did not include Z-pins. Childress assembled two of the stubbled parts around an AS4/3501-6 uncured scrim pad up about 0.090 inch thick with the stubble from each part overlapping, and bonded the assembled parts using the conventional bonding cycle. Then, the resulting bonded assembly was cut into 1×10 inch coupons, thereby having some pin-reinforced, bonded coupons and some coupons lacking pin reinforcement.

Childress tested the specimens in the $G_{1c}$ Mode 1 fatigue test cycle with pull tabs glued to the faces pulled in a standard $G_{1c}$ test fixture. He included a crack starter initiating peel in the bond area. The correlated data with the standard load v. head extension (in-lbs/in) is summarized in Table 1:

TABLE 1

| Specimen | | Load | Comments |
| --- | --- | --- | --- |
| Pinned: | 1 | 5.4 | |
| | 2 | 4.8 | |
| | 3 | 2.86 | *Failed in the laminate above the bond line |
| Unpinned | 4 | 2.75 | |
| | 5 | 3.64 | |
| | 6 | 3.49 | |

Ignoring specimen 3, the Z-pin reinforcement at this relatively low density improved the bond strength with this Mode 1 fatigue measure by about a 45% increase in the peel strength. Upon analysis of the pinned specimens, Childress discovered that some pins were bent, which lowered the reinforcing value (reduced the load I measured). Better bonds (i.e., joints) could be prepared using higher pressure during the bonding cycle.

EXAMPLE 2

I prepared additional specimens using AS4/3501-6 prepreg with 2% by area 0.020 diameter titanium Z-pins inserted into a spar cap. This spar was then cured at 350 degrees F with Z-pin stubble left exposed on the spar cap. The Z-pin stubble was 0.20 inches long. This cured spar was then placed on an uncured skin laminate 0.30 inches thick, with the Z-pin stubble placed against the uncured skin. The spar, associated spar tooling, and skin were then vacuum bagged and autoclave cured at 350 degrees F, using a 100 psi autoclave pressure. The vacuum and autoclave pressure drove the spar down onto the uncured skin and inserted the Z-pin stubble into the skin. The cured final part was then trimmed for pull testing.

Figure 12:
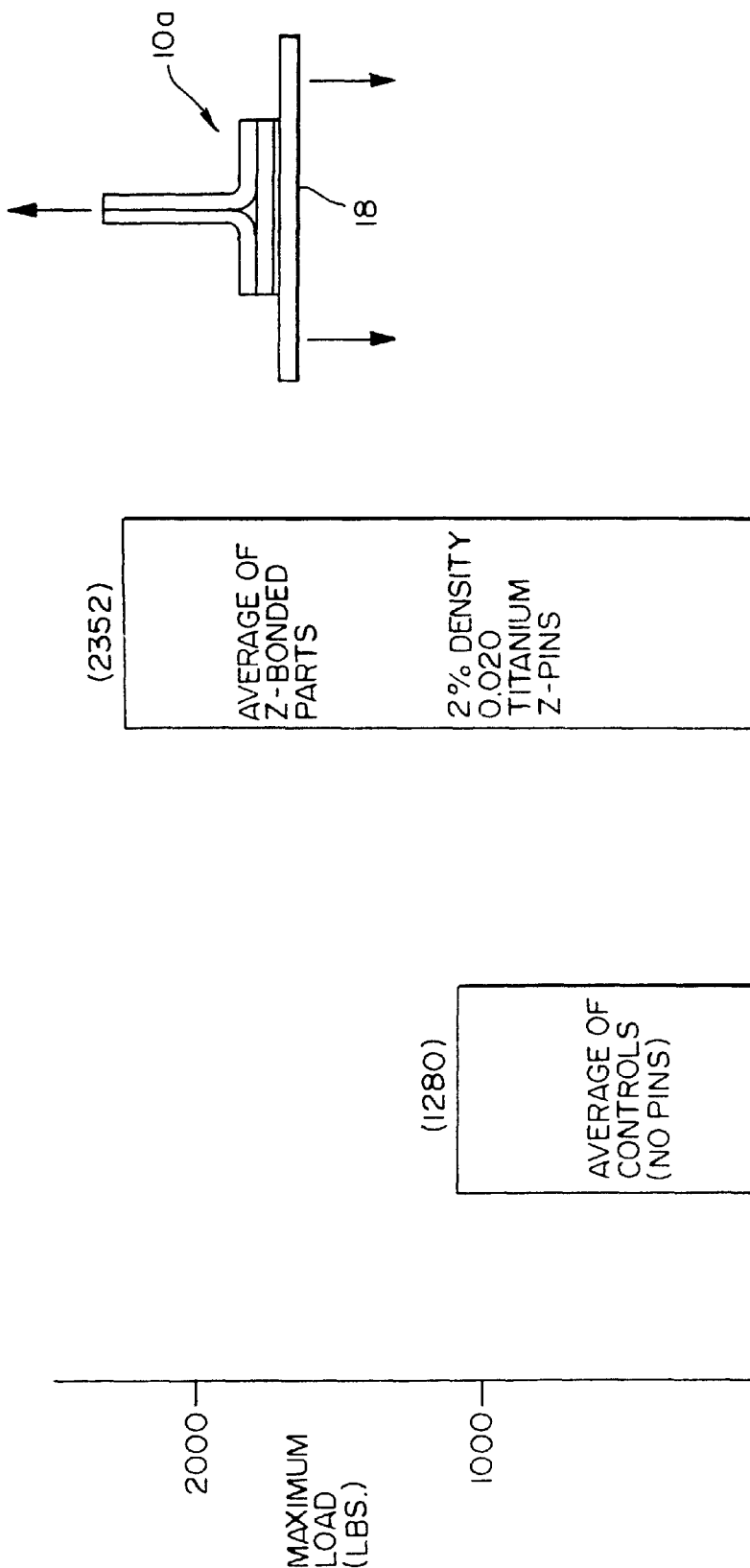
FIG. 12 is another chart showing the improvement in T-stiffener pull-off strength resulting from Z-pin reinforcement.

Pull testing results showed the Z-Bonded parts had an 83 percent greater load carrying capability than the control parts. My results are summarized in FIG. 12.

In a thermoplastic welding process, the padup strip 20 might include a susceptor for interacting with an oscillating magnetic field to generate eddy currents sufficient to melt and cure the bond line resins and to form a weld. Of course, any other arrangement to get the appropriate heating at the bond line can be used when completing the weld.

Figure 13:
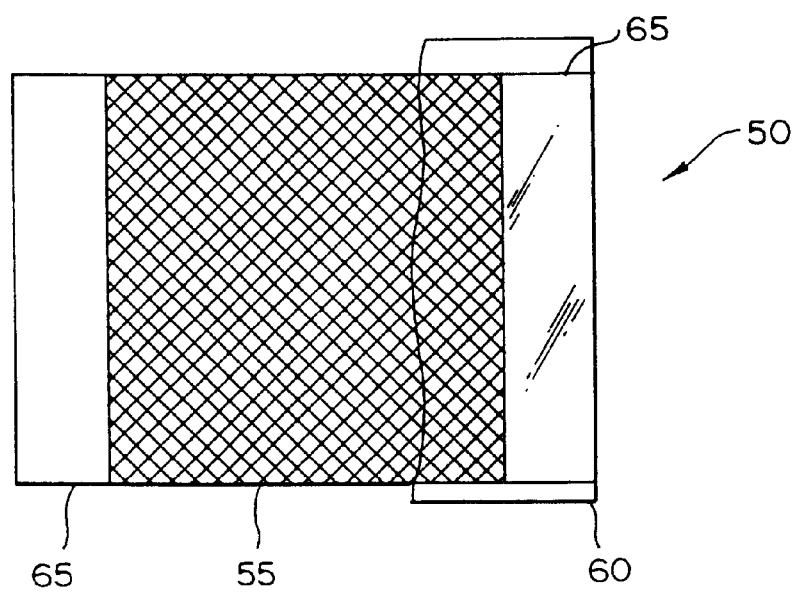
FIG. 13 is a schematic plan view of a typical susceptor useful in thermoplastic (induction) welding operations.
Figure 14:
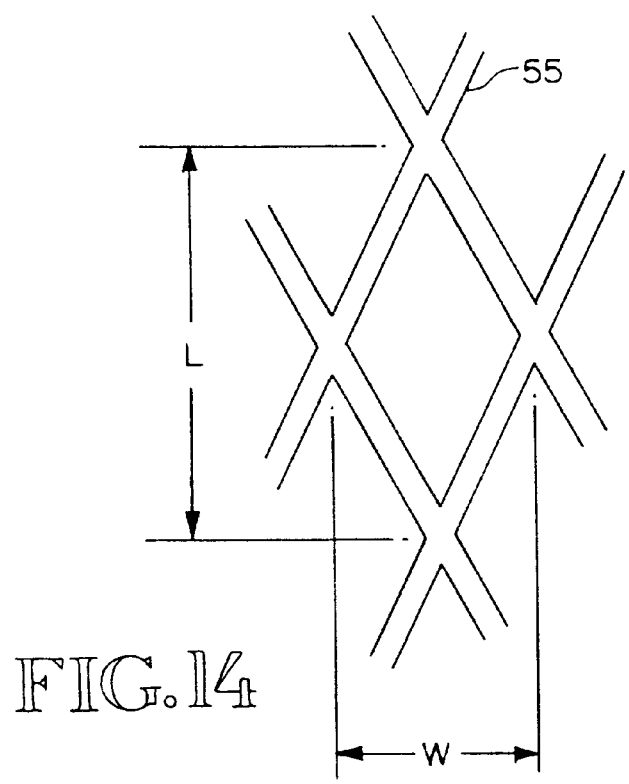
FIG. 14 is a detail of the mesh in the susceptor of FIG. 13.

FIGS. 13 & 14 illustrate a susceptor 50 for themoplastic welding. The susceptor 50 can be used as the padup strip or can be part of my precured strip. The susceptor 50 has a metal mesh 55 and a resin 60 that encapsulates the mesh. Generally the resin is uncured, but, in my preferred application, it would be precured. In FIG. 13, the susceptor includes selvage edge strips 65.

FIG. 14 shows a close-up of the metal mesh 55 to emphasize that the mesh has a significant areal fraction of openings defined by fine-line elements. In the illustrated mesh 55, the openings are diamonds having a length L about twice as long as the width W. I can use any suitable thermoplastic welding susceptor. Energy can be introduced to the susceptor inductively, resistively, by a combination of both, or by any other suitable means.

Now, I turn to a more detailed description of my Z-pin precured strips.

As shown in FIG. 15, a precured spar 10b is joined to a wingskin 18b with a precured strip 99 having Z-pins 130 extending through the strip 99 and into both the spar 10b and skin 18b. In the stubble area, I also use padup strips 20.

The precured strip 99 constitutes a plurality of plys of fiber-reinforced resin or a laminated resin-metal foil composite or any of the other constructions discussed for the core of the sandwich structure in a pin-carrying foam. The strip Z-pins 130 extend in stubble fields on opposed faces of the strip 99. The strip should be thin enough to remain flexible so that it can assume the contour of the bond line. Otherwise, the strip needs to be manufactured with the intended contour and the pieces need to be matched for assembly. Versatility of the strip is diminished.

Figure 16:
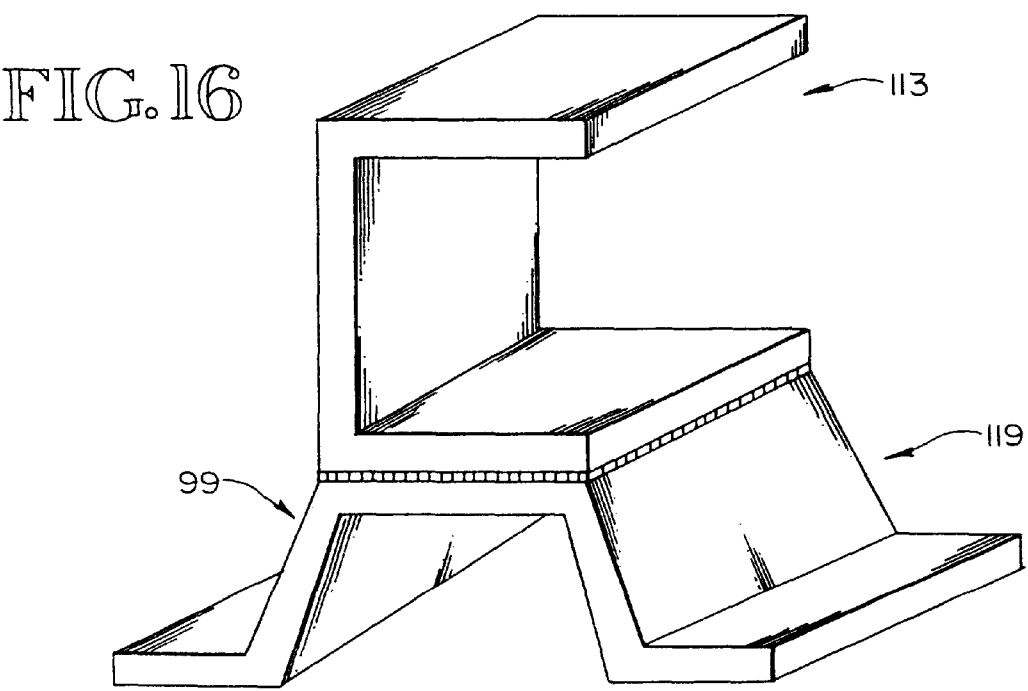
FIG. 16 is a schematic isometric view of an inaccessible flange area at the joint between a "C" section and a hat section where using a precured strip is preferred.
Figure 17:
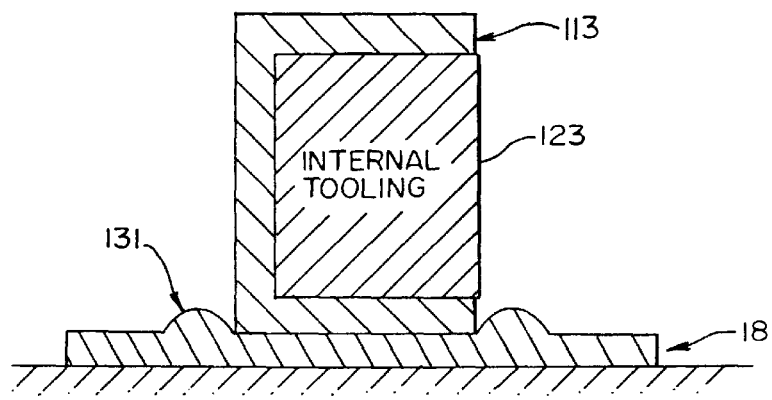
FIG. 17 is a schematic section showing fiber distortion arising in a skin and associated with curing detail parts that connect with inaccessible flanges.

The Childress process for Z-pinning requires that one side of the part be directly accessible to cure pressure or that at least one side of the part be precured to embed the Z-pins. There are many situations in assembly of aerospace composite structure where the need for internal tools precludes use of the Childress concept. For example, as shown in FIG. 16, an inaccessible flange occurs at the bond line between a C-channel 113 and a hat section 119. In this circumstance, however, a precured strip 99 readily allows a Z-pinned joint. The flange is inaccessible because the C-channel is filled with a tool 121 (FIG. 17) during cure and the hat section 119 is fastened to a skin panel to leave a closed volume. Collapse of a foam to drive the pins into the aligned parts is difficult to achieve while retaining close location tolerances for the mated parts.

When a precured part is placed on an uncured part, often the precured part will sink into the uncured part and will distort the fibers. Moving the fibers by only 5% will produce up to a weakening of 40% of the composite's strength, so it is crucial to avoid fiber distortion. Fiber waviness, like that shown in FIG. 17 at site 131, leads to part rejection. Multiple cure cycles slows the production, complicates factory flow, and increase costs.

While fiber waviness can be overcome by conservative overdesign of the skin 18, adding plys to be sure of adequate strength introduces a significant weight penalty and increases the part cost.

Figure 18:
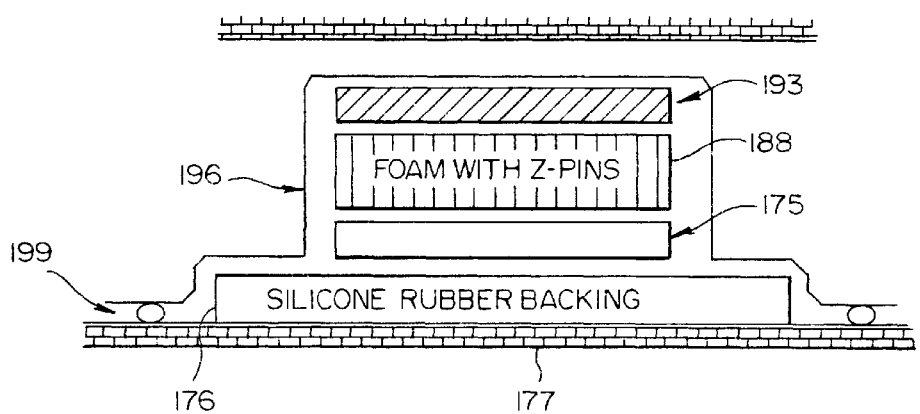
FIG. 18 is a schematic assembly of a pin placement method to make precured strips of the present invention.

The Z-pins 130 in my precured strips 99 should have sufficient size, shape, strength, and orientation so that they resist buckling when the strip is assembled into the final structure. The body of the precured strip 99 can be any material compatible with the other materials in the completed assembly. Usually it is rigid For joining graphite-epoxy detail parts, I recommend that the body of the precured strip 99 be two plys of cured graphite/epoxy fabric. The plys are cured at the same time the pins are inserted with heat and pressure. FIG. 18 schematically illustrates how I make the precured strip. I place the prepreg for the body 175 on a silicone backing 176 atop a hard tooling surface 177. I place a pin-carrying foam 188 atop the body 175 and complete the assembly with a rigid caul plate 193 before enclosing all the layers with a vacuum bagging film 196 that I seal 199 to the tooling surface 177. I force the pins from the pin-carrying foam 188 into the fabric 175 generally in an autoclave under heat and pressure. Of course, I can use any way to apply pressure to the caul plate and to heat the fabric. The thickness of the silicone backing 176 controls the penetration of the pins and produces a precured strip 99 with the desired, opposing stubble fields.

Figure 19:
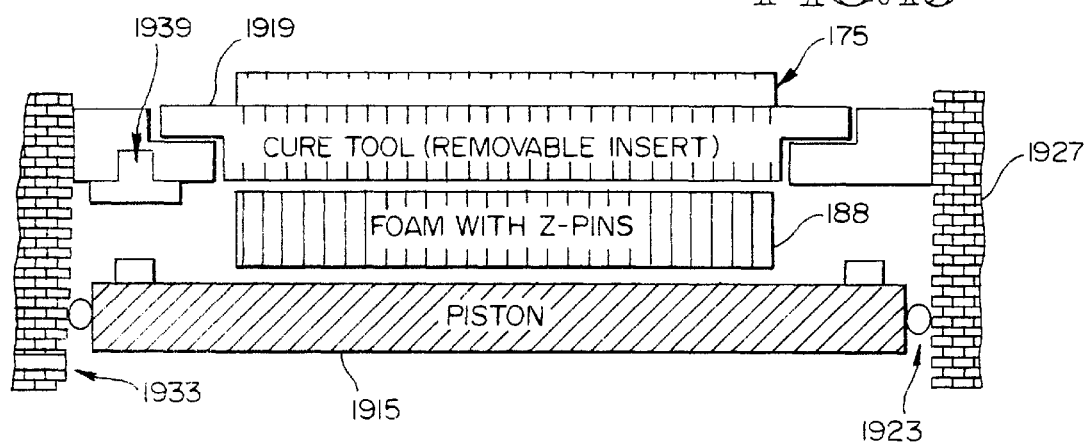
FIG. 19 is a schematic sectional view of Avila's cure tool insert assembly for accurate pin placement.

Avila described an alternative method for inserting the pins in his U.S. Pat. No. 5,833,786 entitled "Tooling for Inserting Z-pins." Avila's insertion machine is shown in FIG. 19 and includes a sliding piston 1915 and cure tool 1919 to ensure that pins in the pin-carrying foam 188 are accurately positioned in the body 175. For simplicity of illustration, I have omitted the silicone backing and vacuum bagging film from FIG. 19.

Figure 20:
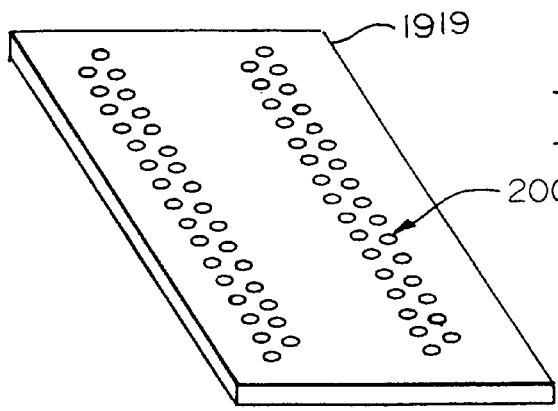
FIG. 20 is a schematic isometric of a typical cure tool insert.
Figure 21:
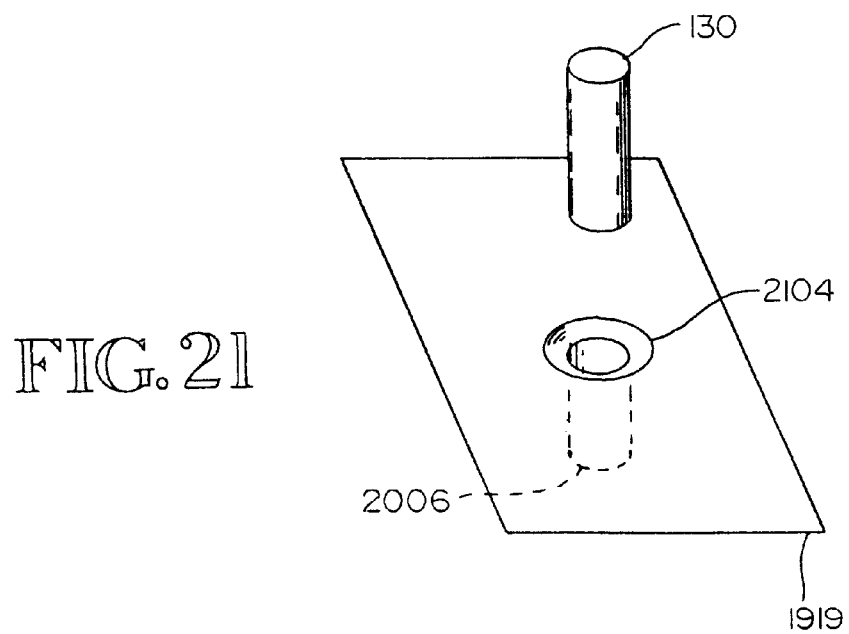
FIG. 21 is a schematic isometric showing a pin interfacing with the funnel nozzle of a throughhole in a cure tool insert of FIG. 19 or FIG. 20.

Sliding seals 1923 between the piston 1915 and a housing 1927 allow the piston to move upwardly when pneumatic pressure is introduced below the piston through pressure inlet 1933. Upward movement of the piston 1915 forces pins 130 in the foam 188 into corresponding holes 2006 (FIG. 20) cut into the cure tool. The pins 130 register with enlarged funnel mouths 2104 (FIG. 21) of each hole 2006 and are guided into the desired location in the prepreg 175. The cure tool 1919 is a metal plate that guarantees that pins 130 do not buckle because the holes 2104 constrict the pins even after the foam decomposes.

Travel of the piston is controlled with a stop 1939 in the insertion tool instead of the thickness of the silicone backing. The Avila tool, therefore, is significantly more flexible in strip manufacture than my original process.

The precured strips 99 can be stored in various lengths until required for use. They can be trimmed to the design configuration and laid up with the associated detail parts in a fashion comparable to the use of unpinned precured strips in cocuring processes. The lay up can be with or without adhesive padup strips 20. The strips 99 allow the use of internal tooling and control of smooth faying surfaces and dimensional tolerances to the intended design.

With a precured strip at the bond line, a continuous pin extends across the entire bond line to anchor in both detail parts in the completed assembly, so I expect improved bond strength even better than the performance Childress measured.

While shown as a flat sheet with opposed pin stubble fields, the precured strip can take other configurations such as a T or cruciform. The strip might even be a pinned radius filler. McCarville et al. described titanium and composite radius fillers or radius inserts of conventional, T, and cruciform (cross) design in U.S. Pat. No. 5,833,786 entitled "Titanium Radius Filler for use in Composite Interfaces," which I incorporate by reference. I can add pins to any of these inserts or fillers.

Precured strips offer the following advantages:

increased pulloff strength of joints or welds;

pin reinforcement at inaccessible flange bond lines where tooling or geometry makes reinforcement difficult with other techniques;

smooth faying surfaces free of fiber distortion;

reduced curing cycles; and robust, factory-ready assembly.

Z-pinned structures have the potential of eliminating fasteners in composite structure because of the increase in compression strength after impact. The pins virtually eliminate composite delamination, increase resistance of the assembly to Live Fire shocks, and provide conductive paths desirable to dissipate lightning strike energy. Pinned assemblies might lead to a 20–30% weight saving in the skin because of the increased strength. Finally, these benefits are achievable at a minimal cost penalty without significant change in existing manufacturing processes.

While I have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

I claim:

1. A bonded composite structure having a reinforced joint at a bond line, the structure being made by the process comprising the steps of:

(a) positioning a strip made from cured resin and carrying Z-direction reinforcing pins embedded therein the strip being positioned along the bond line between at least two composite elements so that the pins in the strip form stubble on opposed surfaces of the strip and are substantially perpendicular or at an angle out of the plane of the bond line;

(b) optionally, applying an adhesive on the interfaces between the strip and the elements;

(c) heating the bond line to connect the elements about the strip with a resin bond to form a joint having Z-pin reinforced bonds between the elements and the strip, the pins penetrating into both elements.

2. The structure of claim 1 further comprising the step of:

applying uncured resin to the surfaces of the strip that have the stubble and that are positioned so that the pins contact the elements, the resin protecting the pins and filling a volume defined by the stubble.

3. A bonded composite structure having a reinforced joint at a bond line, the structure being made by the process comprising the steps of:

(a) positioning a strip made from cured resin and carrying Z-direction reinforcing pins, the strip being positioned along the bond line between at least two composite elements so that the pins in the strip form stubble on opposed surfaces of the strip and are substantially perpendicular or at an angle out of the plane of the bond line, wherein the strip includes a metal susceptor heatable with an induction coil, the susceptor being encased in the resin;

(b) optionally, applying an adhesive on the interfaces between the strip and the elements;

(c) heating the bond line to connect the elements about the strip with a resin bond to form a joint having Z-pin reinforced bonds between the elements and the strip, the pins penetrating into both elements.

4. The structure of claim 3 wherein the elements are thermoplastic and the joint is a thermoplastic weld.

5. A bonded composite structure having a pin-reinforced thermoplastic weld, comprising:

(a) at least two fiber-reinforced composite elements arranged to define a bond line along an interface between the elements;

(b) a composite strip of cured resin having X-Y fiber reinforcement and Z-pin reinforcement, the strip being positioned along the bond line; and (c) a thermoplastic weld between each element and the strip along the interface, the welds including Z-pin reinforcement resulting from penetration of the Z-pins in the strip into each weld.

6. A bonded composite structure, comprising:

a) at least two fiber-reinforced composite elements arranged to define a bond line along an interface between the elements;

(b) a composite strip of cured resin having X-Y fiber reinforcement and Z-pin reinforcement, the strip being positioned along the bond line; and c) bonds between the elements and the strip along the interface, the bonds including Z-pin reinforcement resulting from penetration of the Z-pins in the strip into each bond, wherein the strip includes a metal susceptor susceptible to heating by magnetic induction.

7. The structure of claim 6 wherein the resin is thermoplastic and the bonds are thermoplastic welds.

8. The structure of claim 7 wherein the strip includes a metal susceptor susceptible to heating by magnetic induction.

9. The structure of claim 7 wherein the Z-pin reinforcement is carbon fiber, the resin includes polyimide, and the strip includes a metal susceptor susceptible to heating by magnetic induction.

* * * * *